(12) United States Patent
Bermundo et al.

(10) Patent No.: US 11,762,673 B2
(45) Date of Patent: Sep. 19, 2023

(54) EXTENSIBLE FORMAT-INDEPENDENT MIDDLEWARE MESSAGE INTERPRETER

(71) Applicant: KYOCERA Document Solutions, Inc., Osaka (JP)

(72) Inventors: Neil-Paul P. Bermundo, Glendora, CA (US); Katherine Bayquen Lao, Pacheco, CA (US)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 213 days.

(21) Appl. No.: 17/461,683

(22) Filed: Aug. 30, 2021

(65) Prior Publication Data
US 2023/0068519 A1 Mar. 2, 2023

(51) Int. Cl.
*G06F 9/445* (2018.01)
*G06F 9/54* (2006.01)
*G06F 8/61* (2018.01)
*G06F 9/4401* (2018.01)

(52) U.S. Cl.
CPC ............ *G06F 9/44526* (2013.01); *G06F 8/61* (2013.01); *G06F 9/4413* (2013.01); *G06F 9/542* (2013.01); *G06F 9/546* (2013.01)

(58) Field of Classification Search
None
See application file for complete search history.

(56) References Cited

U.S. PATENT DOCUMENTS

| 9,690,638 | B2 | 6/2017 | Shi et al. | |
|---|---|---|---|---|
| 2003/0016682 | A1* | 1/2003 | Cho | H04L 12/2805 370/466 |
| 2004/0103144 | A1* | 5/2004 | Sallam | H04L 67/12 709/236 |
| 2013/0318512 | A1* | 11/2013 | Kuppala | G06F 9/44526 717/166 |
| 2019/0095258 | A1* | 3/2019 | Chandrasekaran | G06F 9/542 |

* cited by examiner

*Primary Examiner* — Qing Chen
(74) *Attorney, Agent, or Firm* — Rowan TELS LLC

(57) ABSTRACT

A method and apparatus for an extensible, format-independent middleware message interpreter is disclosed in which a host machine is configured with a universal message service (UMS). The UMS communicates with local and cloud servers and destination devices. The UMS is configured with a plug-in service that can accommodate plug-in libraries of plug-in modules. The UMS receives formatted messages from the local and cloud server applications and destination devices, parses the messages, and identifies a command message type. Based on the command message type, the UMS performs actions including executing the local command on the host machine, relaying the embedded-sub-message data to the at least one destination device as indicated by the destination identification, and relaying the embedded-sub-message data to the plug-in service.

20 Claims, 11 Drawing Sheets

EXTENSIBLE FORMAT-INDEPENDENT MIDDLEWARE MESSAGE INTERPRETER

BACKGROUND

In developing a middleware software component for a production printing project, a need to modify the middleware software component arose every time a new message was defined and needed to be activated. Even with existing protocols such as JDF, XML, and JSON for data formats, the keywords and data used in each or all those data formats must be "known" to both the server-side software application and the client-side application. The middleware software component needs to detect whether a message is meant to be forwarded down to devices, like printers, or executed at the host machine where the middleware software component is executing or running.

There is therefore a need for an improved middleware software component that interprets future messages such that it does not need to know the actual keywords within the XML, JDF, or JSON messages, but instead, may handle them transparently, seamlessly, and efficiently.

BRIEF SUMMARY

A method and apparatus for implementing an extensible, format-independent middleware message interpreter is disclosed. In one aspect, the method includes configuring a host machine with a universal message service (UMS), the UMS transmitting to and receiving from at least one of a local server application and a cloud server application, and to at least one destination device. The method further includes configuring the UMS with a plug-in service, the plug-in service accommodating at least one plug-in library. The at least one plug-in library includes at least one installable plug-in module. The method also includes receiving a formatted message at the UMS from at least one of the local server application and the cloud server application. The formatted message includes a destination identification, a command message type, an actual message type, and an actual message including embedded-sub-message data. The method further includes parsing and identifying the command message type at the UMS, the command message type being at least one of a local command, a relay command, and a relay plug-in command. The method finally includes performing at least one action based on the command message type, where the at least one action includes at least one of executing the local command on the host machine, relaying the embedded-sub-message data to the at least one destination device as indicated by the destination identification, and relaying the embedded-sub-message data to the plug-in service. In one aspect, the apparatus is a computing apparatus that includes a processor and a memory, the memory storing instructions that, when executed by the processor, implement this method using the computing apparatus.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
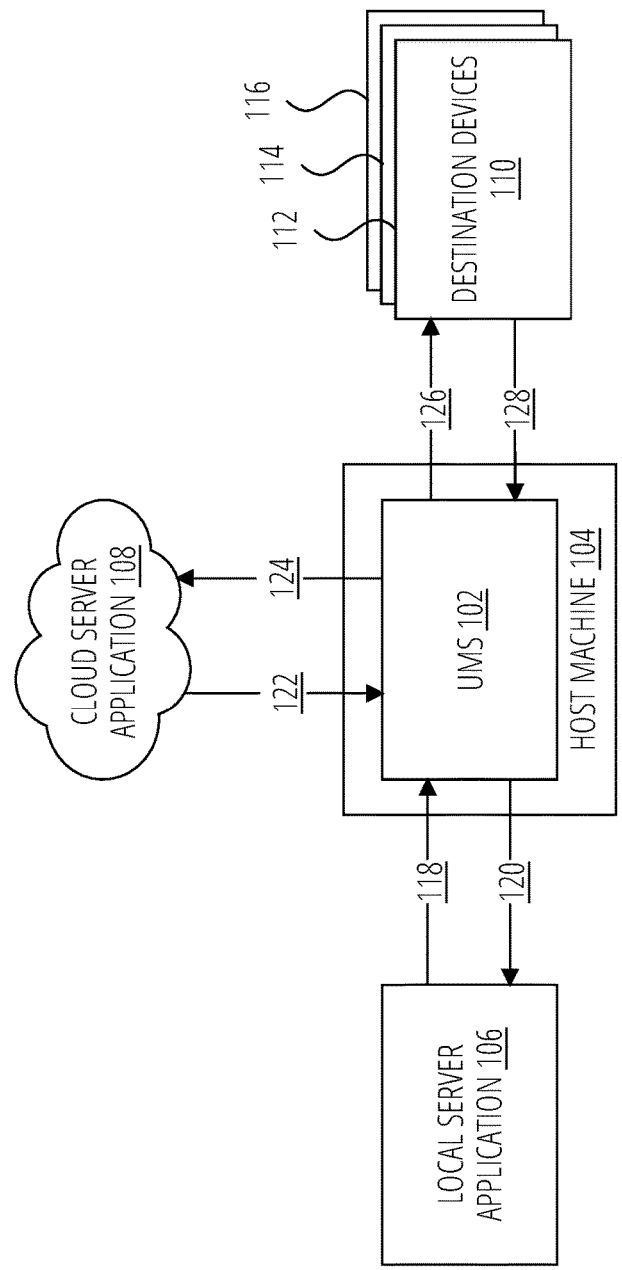
FIG. 1 illustrates a UMS system 100 in accordance with one embodiment.

The universal message service (UMS) disclosed herein provides a solution for seamless messaging between a client application and a server or cloud application. In conventional approaches, this is implemented as proprietary messaging involving agreed-upon protocols for messages to be understandable between the client and server software services. When new features are implemented, the protocol needs to be updated, leading to client software needing re-installation or updating across all client devices. If the client software is installed in hundreds to thousands of devices, this becomes a maintenance challenge. The disclosed universal message service represents a significant improvement, as it does not rely on updates to both the client and server software.

The UMS is a middleware software component that may receive messages from anywhere, particularly, from a cloud server application or local server application. The middleware software component will be able to "understand" the content of the message, be it in any format such as XML, JDF, JSON, or future formats, and be able to act upon it. For the purposes of this disclosure, universal message service or UMS may be used interchangeably with "middleware software".

This disclosure proposes the use of installable modules or plug-in libraries, which may interface with the middleware software component to translate incoming formatted message(s). Developers and third-party entities may create installable/plug-in modules for seamless integration, as plug-and-play modules at the machine or computer where the UMS is executing or hosted. The already-running UMS component may automatically detect the presence of the installable module and allow it to interpret or translate incoming formatted messages through the functionalities available to or provided by the installable module.

Plug-in libraries or installable plug-in modules may add features and capabilities that are not determined during implementation of the main UMS middleware software, local server or cloud applications, and devices. When features and capabilities are known at implementation time, corresponding local command and relay command messages may be implemented as integrated features and capabilities in UMS, in local server and cloud applications, and in device firmware. At some point, however, especially when many UMS and devices have been deployed, re-installing firmware may become costly. It may be cheaper to implement installable options or plug-in libraries that may be installed remotely in the UMS host machine or in the devices to add new features and capabilities.

A plug-in library may expose or support application programming interfaces (APIs) enumerating its capabilities. It may provide a header file or other means for identifying the APIs available from the library. It may support predetermined APIs for relaying message data and checking status of a device through the plug-in library. The UMS may relay a message to the plug-in library. The plug-in library may return a callback function for retrieving the result of the plug-in processing of the message. The plug-in library may process the message at the time of receipt, or it may process it later when callback function is called. The UMS may relay a message that queries the plug-in library for a status of a device. The plug-in library may return status directly or via a callback function.

The plug-in library may register with the UMS, so that UMS may send messages to it when messages are received from local server or cloud applications. The plug-in library may also de-register from the UMS, so that it stops receiving messages afterwards. This function may also uninstall the plug-in library from the UMS host machine. Other functions or APIs may be developed to allow for extending functionality of UMS middleware software component.

The disclosed solution may improve the development experience for new communication services by reducing reliance on updating installed components, such as the middleware software component. Using the disclosed method and apparatus, re-installation of the deployed middleware software component may not be needed. Installable modules that the middleware software component can detect and communicate with may instead be added and updated as needed.

FIG. 1 illustrates a UMS system 100 in accordance with one embodiment. The UMS system 100 comprises a universal message service 102, a host machine 104, a local server application 106, a cloud server application 108, destination devices 110 including destination device 1 112, destination device 2 114, and destination device 3 116.

The universal message service 102 may reside between the local server application 106 and/or cloud server application 108 and the destination devices 110, such as printers, that these server applications direct. Upon receiving a request 118 from the local server application 106 or a request 122 from the cloud server application 108, the universal message service 102 may execute the command or instruction in that request at the host machine 104 where it is installed, hosted, or executing. The universal message service 102 may return a response 120 and a response 124 to the local server application 106 and cloud server application 108 respectively.

Alternately, the universal message service 102 may relay or forward the message, command, or instruction as a request 126 to the appropriate destination device(s) 110, which may be known by or reachable from the universal message service 102. The destination devices 110 may return a response 128 to the universal message service 102.

Figure 3:
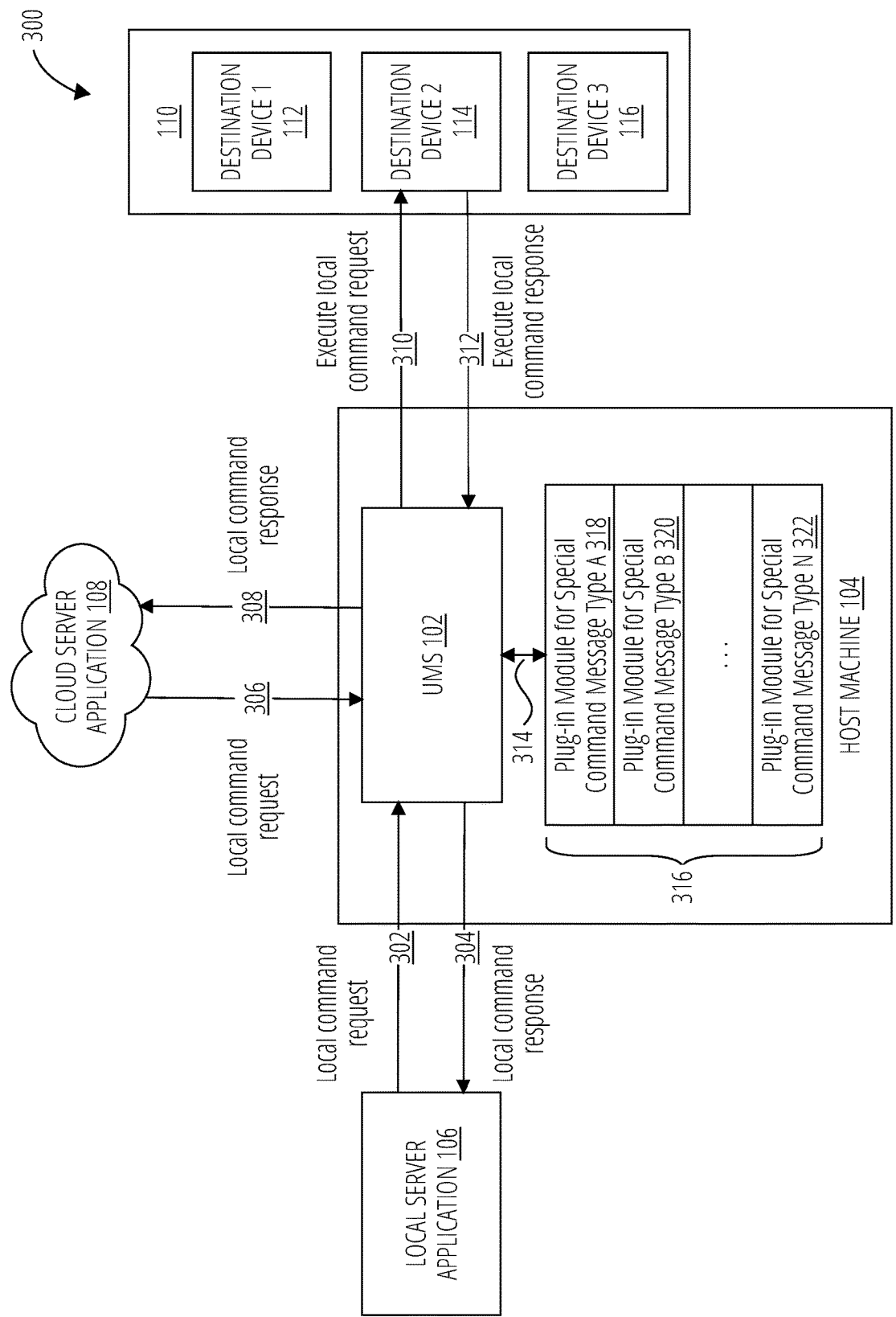
FIG. 3 illustrates a local command 300 in accordance with one embodiment.
Figure 5:
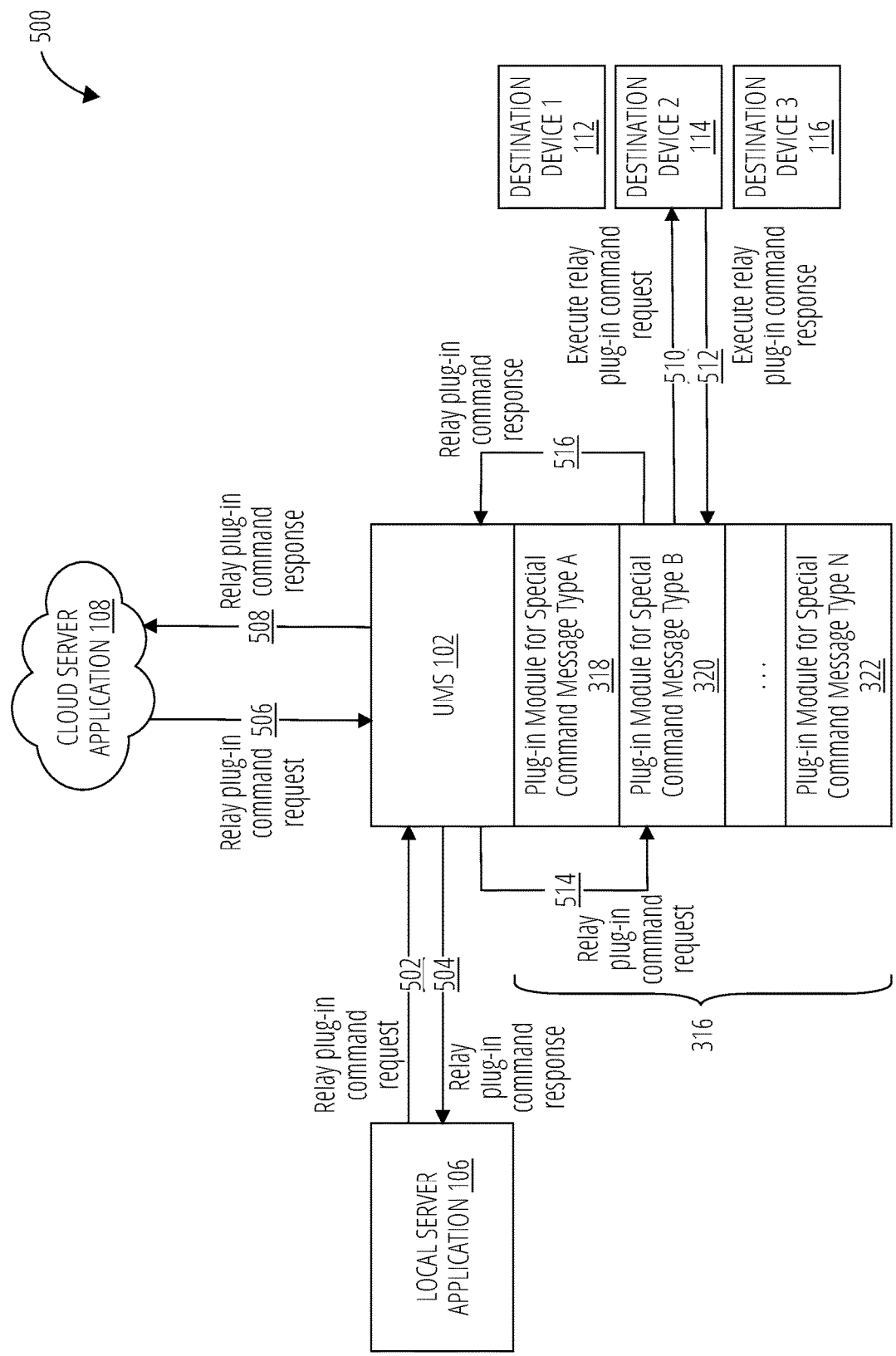
FIG. 5 illustrates a relay plug-in command 500 in accordance with one embodiment.

The universal message service 102 may also relay or forward the message to installable or plug-in libraries installed with the universal message service 102 on the host machine 104, as described in detail with respect to FIG. 3 and FIG. 5. The host machine 104 that hosts the universal message service 102 and plug-in libraries may be a computing device such as the computing apparatus 1000 described in more detail with respect to FIG. 10.

Both the local server application 106 and the cloud server application 108 may be the source of messages to be sent to the destination devices 110 through the universal message service 102, acting as a middleware software component. The local server application 106 may be run on a computer or printing server physically located in the same building or office as the destination devices 110, or housed in a dedicated off site location, but comprises a server owned and managed by the same entity as the destination devices. A cloud server application may be an application running in a cloud environment supported by hardware owned by a third party, such as Microsoft Azure, Amazon Web Services, Google cloud, etc.

There may be several to very many devices visible to the universal message service 102 that may not be visible to the local server application 106 or cloud server application 108. These destination devices 110 such as destination device 1 112, destination device 2 114, and destination device 3 116 may be multi-function peripherals, scanners, fax machines, copiers, computers, smartphones, tablets, laptops, personal digital assistants, and other printers, computers, and mobile devices. The destination devices 110 may support message formats or message types that are not necessarily understandable or meaningful to the middleware software component itself because most of those messages are meant to be relayed or processed in the devices.

Establishing Connection Between Server Application and Middleware Software

The universal message service 102 may establish a connection with the local server application 106 or cloud server application 108 using Web Socket or any two-way communication protocol. Once connection is established, the universal message service 102 may freely receive messages from and send messages to local server applications 106 and cloud server applications 108. The UMS system 100 may support multiple server applications to connect to one universal message service 102. The UMS system 100 may also support multiple middleware software components or universal message services 102 in at least one host machine 104.

Figure 2:
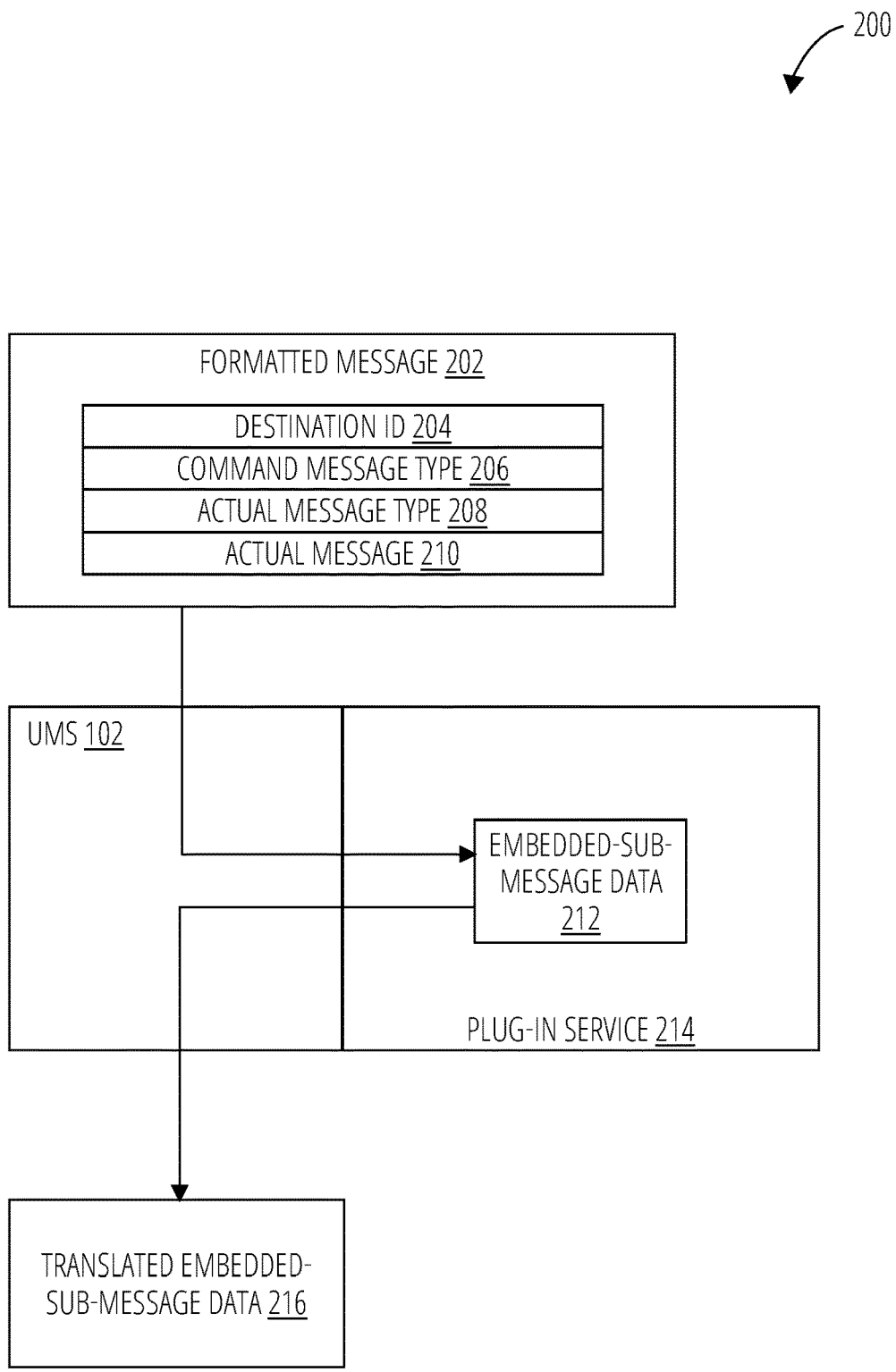
FIG. 2 illustrates translating embedded-sub-message data 200 in accordance with one embodiment.

FIG. 2 illustrates translating embedded-sub-message data 200 in accordance with one embodiment. The universal message service 102 may establish a permanent connection with the destination devices 110, such as via Web Socket, or on-demand connections via HTTP. When a server application such as the local server application 106 or cloud server application 108 introduced in FIG. 1 needs to send messages to supported and connected destination devices 110 via the universal message service 102, it may send a formatted message 202, for example, a JSON message, that includes the following elements:

destination identification 204—This is the ultimate destination of the message. The message destination may be a separate device from the host machine where the universal message service 102 is installed or within the system where the universal message service 102 is installed. It may be an IP address, hostname, MAC address, a URL, or may be another system process or service, or a file directory.

Figure 4:
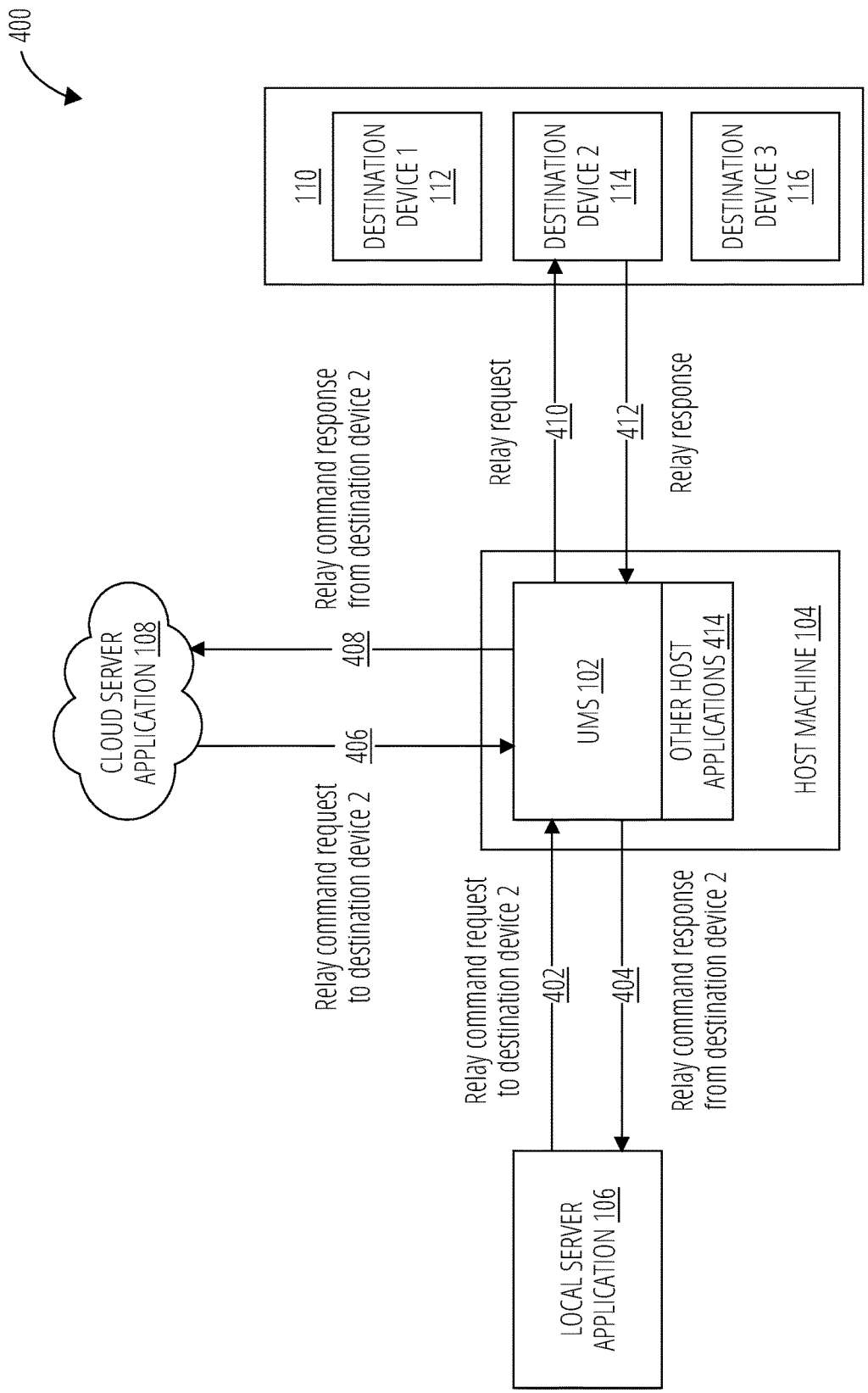
FIG. 4 illustrates a relay command 400 in accordance with one embodiment.

Command message type 206—This may be a local command 300 such as is illustrated in FIG. 3, a relay command 400 such as is illustrated in FIG. 4, or a relay plug-in command 500 such as is illustrated in FIG. 5. For responses, the command message type 206 may similarly be a local command response, a relay command response, or a relay plug-in command response.

Actual message type 208—This may be a known message format like JSON, XML, JDF, etc., or a proprietary message type. When using a proprietary message type, the corresponding Universal Message Service plugin is needed, as described with respect to FIG. 5.

Actual message 210—This is the embedded sub-message data which may be in any format (XML, PDF, JSON, JDF, scripts, etc.) that the destination understands and processes.

The universal message service 102 may receive a formatted message 202 from a local or cloud server application in any messaging format (XML, JDF, JSON, etc.). In one embodiment, the universal message service 102 then relays the formatted message 202 and its embedded-sub-message data 212 to the plug-in service 214. The plug-in service 214 may parse and identify the related embedded-sub-message data 212. The plug-in service 214 may further translate the embedded-sub-message data 212, resulting in translated embedded-sub-message data 216.

The translated embedded-sub-message data 216 may be executed on the universal message service 102, or may be relayed to another application running on the host machine. Alternately, the translated embedded-sub-message data 216 may be relayed to the identified destination device. If the destination device is not able to process the translated embedded-sub-message data 216, a response may be sent to the user.

The universal message service 102 may pass the formatted message 202 through its registered and detected list of installable plug-in modules. As a result, the universal message service 102 may receive instruction and callback functions from the installable module(s). If an installable module says it is able to handle the formatted message 202, the universal message service 102 may begin processing through the installable module. The universal message service 102 may call the callback functions from the installable module(s) in pre-defined or agreed-upon sequence, passing data for each step. The universal message service 102 may receive any return value or response from each step and relay it to next step. Upon calling the last callback function (or last step), the universal message service 102 may collect data and return to server or a designated receiving URL or location.

If there are no installable modules that are able to process the formatted message 202, the universal message service 102 may confirm whether the formatted message 202 is intended for execution at the host machine using a pre-determined callback function or protocol. In this case, the embedded-sub-message data 212 may be communicated to the host machine, which may perform or execute the instruction or command in the formatted message 202. In one embodiment, a callback function in an installable module may perform or execute script, functionality, or code, at the host machine.

If a response is to be sent back to the local server application or cloud server application, a response from a device and/or plug-in module may be sent back to the main universal message service 102. The universal message service 102 in turn may package the embedded-sub-message data 212 similarly as translated embedded-sub-message data 216 for the server application, but with the actual message type indicated as a response. The universal message service 102 may then send it back via the two-way communication protocol.

Security features may be developed into the system to ensure that data in the host machine, connected devices, and universal message service 102 is not compromised. This may be through handshaking, encryption, and/or use of other authentication mechanisms between server/cloud application, universal message service 102, and operating systems. The messages exchanged between servers, universal message service 102, and devices may be encrypted and protected with security measures and transmitted via secure connections, such as HTTPS, WebSocket secured, etc. The logs and configuration files may also be encrypted and secured. Log entries may also support different security levels, such that confidential information and configuration may not be visible to ordinary users.

FIG. 3 illustrates a local command 300 in accordance with one embodiment. The local command 300 may be an action that the universal message service 102 knows how to execute locally in the host machine 104 where the service is running. Local commands 300 may be pre-determined, pre-programmed, and known to the service at deployment time.

In this embodiment, a local server application 106 or cloud server application 108 may send a local command request 302 or local command request 306 respectively, as shown. The universal message service 102 may execute, at either the host machine 104 or device, such as destination device 2 114. As described with respect to FIG. 2, the universal message service 102 may send the command request message to the plug-in service 314, where plug-in libraries 316 such as plug-in module for special command message type A 318, plug-in module for special command message type B 320, through plug-in module for special command message type N 322. It may send embedded-sub-message data as part of an execute local command request 310 to destination device 2 114.

When the command request is executed, the universal message service 102 may receive status or execute local command response 312 from the device(s). The universal message service 102 may then send back the status or response to the sending local server application, such as local command response 308 to cloud server application 108 or local command response 304 to local server application 106.

FIG. 4 illustrates a relay command 400 in accordance with one embodiment. The relay command 400 may be a message type that the universal message service 102 forwards or relays to a destination device, which may be any device or other host applications 414 in the host machine 104 or in a network, such as destination device 2 114 or other destination devices 110. A relay command 400 may also be a message from which the universal message service 102 extracts data or a message to be sent to the destination device. Relay commands 400 may be pre-determined at deployment time. In one embodiment, the relay command may be a print job. The relay command may have embedded-sub-message data.

In this embodiment, the local server application 106 or cloud server application 108 may send a message meant to be relayed to a selected destination device. For example, the local server application 106 may send the relay command request 402 intended for destination device 2 114, or the cloud server application 108 may send the relay command request 406 intended for destination device 2 114. The relay command request 402 or relay command request 406 may be sent through the universal message service 102, which knows how to relay the message to destination device 2 114 in the underlying network as relay request 410. The relay response 412 received from destination device 2 114 to the universal message service 102 may be sent back to the sender by the universal message service 102. This may comprise the universal message service 102 sending relay command response 404 to the local server application 106 or sending relay command response 408 to the cloud server application 108.

FIG. 5 illustrates a relay plug-in command 500 in accordance with one embodiment. The relay plug-in command 500 or library command may be a type of message or data that the universal message service 102 may forward/relay/transmit to the plug-in library 316 as in the relay plug-in command request 514 to plug-in module for special command message type B 320. The plug-in library 316 or plug-in module (such as 320) may know how to handle this message/data. In one embodiment, the message may be plain data "understandable" to the plug-in library, or an executable script/code that the plug-in library 316 knows how to execute. Once executed, the plug-in library 316 may return a response, such as the relay plug-in command response 516 from plug-in module for special command message type B 320.

FIG. 5 shows how a local server application 106 or cloud server application 108 may send a relay plug-in command request 502 or relay plug-in command request 506 message, respectively, to be relayed to installable or plug-in modules that are installed with the universal message service 102 in the host machine as a plug-in library 316, such as plug-in module for special command message type A 318, plug-in module for special command message type B 320, through plug-in module for special command message type N 322. The messages may be sent through the universal message service 102, which knows how to relay the messages to the plug-in modules.

Plug-in modules may execute or relay command to selected and connected device(s), such as destination devices 110. For example, plug-in module for special command message type B 320 may process a request from the local server application 106 or cloud server application 108, forwarded by the universal message service 102 as relay plug-in command request 514. The plug-in module for special command message type B 320 may determine that an execute relay plug-in command request 510 is to be sent to destination device 2 114. In one embodiment, the plug-in modules may execute or relay command to other applications, services, or operating system in the host machine, and not just devices. Plug-in module for special command message type B 320 may return status or response from its operations back to the UMS upon completion of operations, as relay plug-in command response 516. destination device 2 114 may return an execute relay plug-in command response 512 as a result of its processing. The universal message service 102 may return relay plug-in command response 504 to the local server application 106 or relay plug-in command response 508 to the cloud server application 108.

Figure 6:
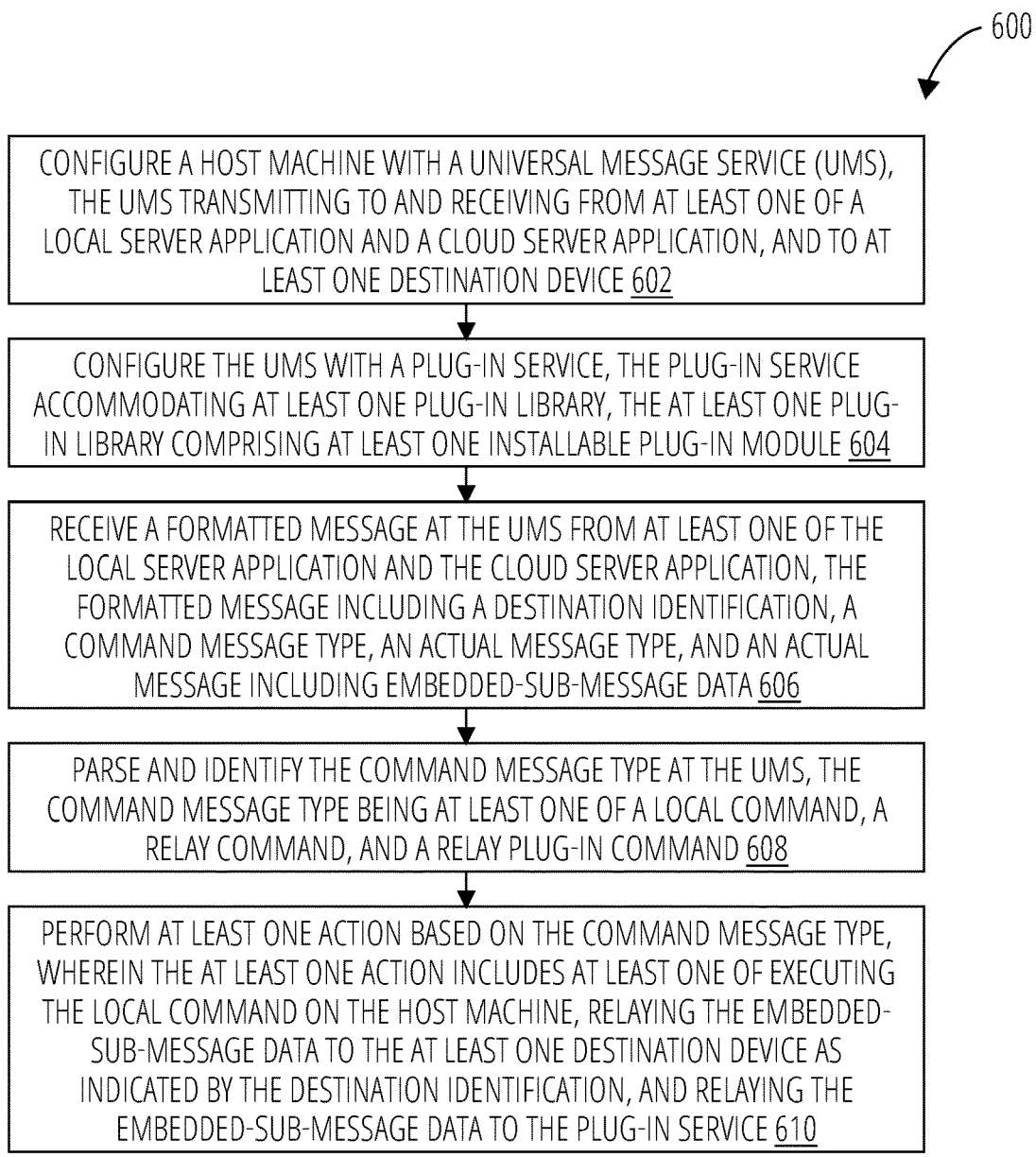
FIG. 6 illustrates a routine 600 in accordance with one embodiment.

FIG. 6 illustrates a routine 600 in accordance with one embodiment. In block 602, a host machine may be configured with a universal message service (UMS). The UMS may transmit to and receives from at least one of a local server application and a cloud server application. The UMS may also transmit to at least one destination device.

In block 604, the UMS may be configured with a plug-in service. The plug-in service may accommodate at least one plug-in library. The at least one plug-in library may comprise at least one installable plug-in module. In one embodiment, at least one plug-in library may be installed the plug-in service.

In one embodiment, the at least one of plug-in library files, plug-in library scripts, the installable plug-in modules, and a plug-in library installation program may be packaged into a local command message. This local command message may be received at the UMS. The local command message may instruct the UMS to install at least one of the plug-in library files, the plug-in library scripts, the installable plug-in modules, and the plug-in library installation program. The at least one plug-in library may be installed on the host machine. A plug-in library installation program stored on the host machine may be used to install the plug-in library. The UMS may call at least one of an operating system process and a third-party tool to perform the installation of the at least one plug-in library.

In one embodiment, the at least one plug-in library may be auto-registered with the UMS upon installation. In one embodiment, the UMS may call a registration application programming interface of the at least one plug-in library to register the at least one plug-in library with the UMS.

In block 606, a formatted message may be received at the UMS from at least one of the local server application and the cloud server application. The formatted message may include a destination identification, a command message type, an actual message type, and an actual message. The actual message may include embedded-sub-message data.

In block 608, the command message type may be parsed and identified at the UMS. The command message type may be at least one of a local command, a relay command, and a relay plug-in command.

In block 610, at least one action is performed based on the command message type. The at least one action may include at least one of executing the local command on the host machine, relaying the embedded-sub-message data to the at least one destination device as indicated by the destination identification, and relaying the embedded-sub-message data to the plug-in service.

In one embodiment, the plug-in service may parse and identify the relayed embedded-sub-message data, and may translate the embedded-sub-message data, resulting in translated embedded-sub-message data. At least one of executing the translated embedded-sub-message data on the UMS, relaying the translated embedded-sub-message data to another application running on the host machine, and relaying the translated embedded-sub-message data to the at least one destination device may be performed. On condition that the at least one destination device does not have the ability to process the translated embedded-sub-message data, a response may be sent to a user.

In one embodiment, the command message type may be the local command executed on at least one of the UMS and another application running on the host machine. The local command may also indicate actions including auto-discovery of the destination devices, retrieval of device attributes, destination device firmware updates, destination device settings queries and changes, rebooting the destination device, restarting the destination device, and waking the destination device up from a sleep state.

In one embodiment, where the command message type is the relay command, the formatted message may be transmitted to the at least one destination device. The relay command includes the embedded-sub-message data to be processed. In one embodiment, the relay command may be a print job.

The method may also include where the command message type is the relay plug-in command and the plug-in service includes the at least one plug-in library, the method further includes transmitting the formatted message to the plug-in service, where the relay plug-in command is at least one of a plain data message the at least one plug-in library is able to understand and an executable script the at least one plug-in library is able to execute. Other technical features may be readily apparent to one skilled in the art from the figures, descriptions, and claims disclosed herein.

Figure 7:
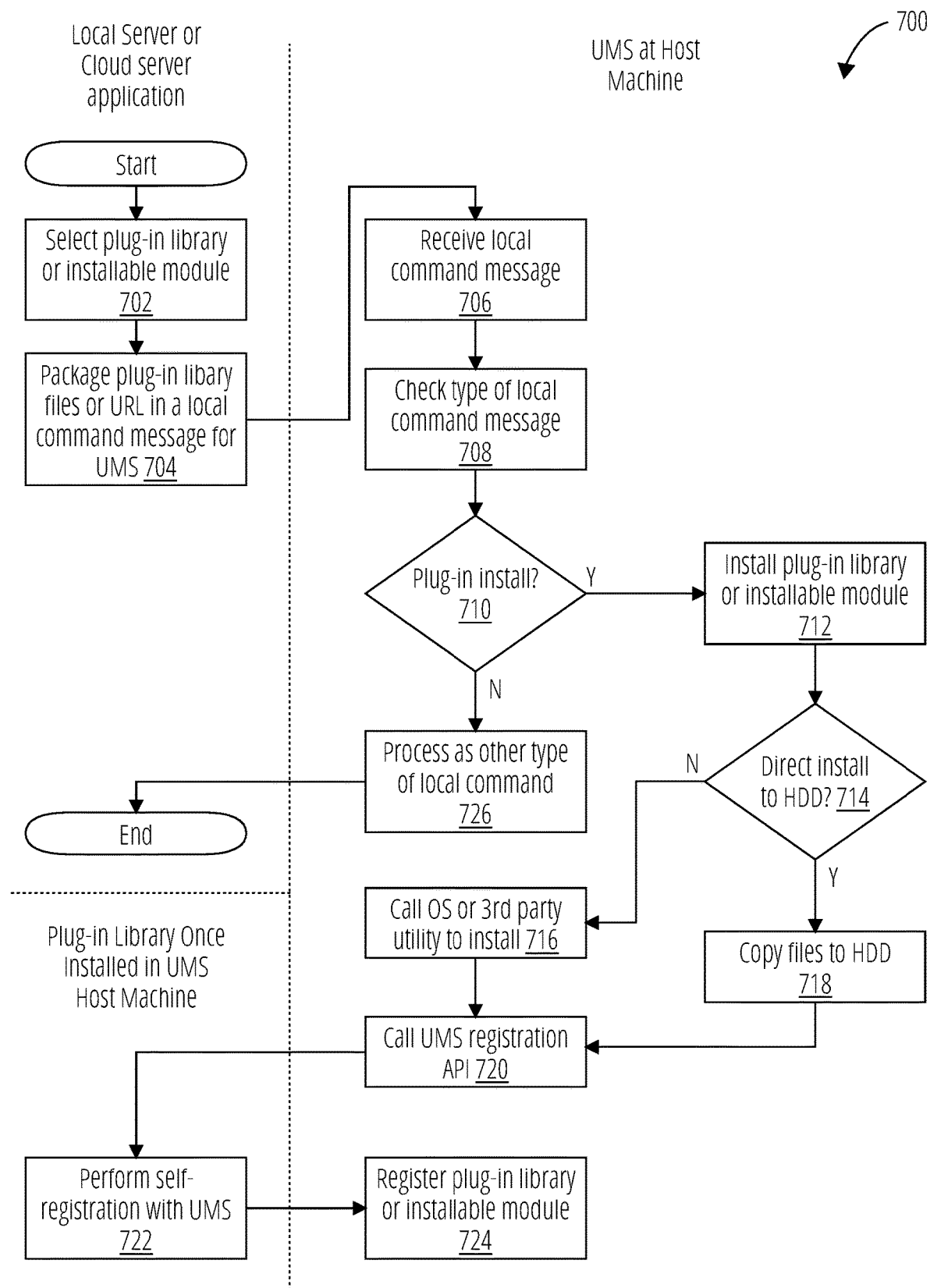
FIG. 7 illustrates a plug-in integration process 700 in accordance with one embodiment.

FIG. 7 illustrates a plug-in integration process 700 in accordance with one embodiment. In one embodiment, the plug-in library may be installed independently using some standalone installation program that an IT staff can perform at the host machine where UMS is hosted. In another embodiment, the plug-in library may be installed remotely via the local or cloud server application, through the UMS. In block 702, the local or cloud server application may select a plug-in library or installable module for installation. In block 704, the local or cloud server application may package the plug-in library files, scripts, installation program, or a uniform resource locator (URL) for the location of the files needed for installation in a local command message for UMS.

In block 706, the UMS may receive the local command message that instructs it to install the included installation program, script, or files, or those found at the included URL. In block 708, the UMS may check type of local command message. At decision block 710, if the local command message type indicates a plug-in install, the UMS will proceed to the actions in block 712. If the message type does not indicate a plug-in installation, the UMS will process the command as another type of local command at block 726, and the plug-in integration process 700 will end. Other types of local commands may be as described with regard to the local command 300 introduced in FIG. 3.

In block 712, if the UMS detects that the command is a custom local command indicating a plug-in library installation, the UMS may install plug-in library or installable module. The UMS may download or extract the installation program, script, or files or retrieve them from the URL indicated. The UMS may detect at decision block 714 whether or not it may directly install the plug-in library to the host machine hard drive (HDD). If a direct install to HDD is indicated at decision block 714, the UMS at block 718 may copy the files to the HDD, installing the plug-in library on the host machine. In one embodiment, the UMS may also call an Operating System process or call third-party tools to do the actual installation of the library, as in block 716.

At block 720, the UMS may call a registration API of the library to register the newly installed plug-in library. The installed plug-in library may then, in block 722, perform self-registration with the UMS. In one embodiment, the Plug-In Library will auto-register with the UMS upon installation. The plug-in integration process 700 may be completed after block 724, when the plug-in library or installable module is registered with the UMS.

Figure 8:
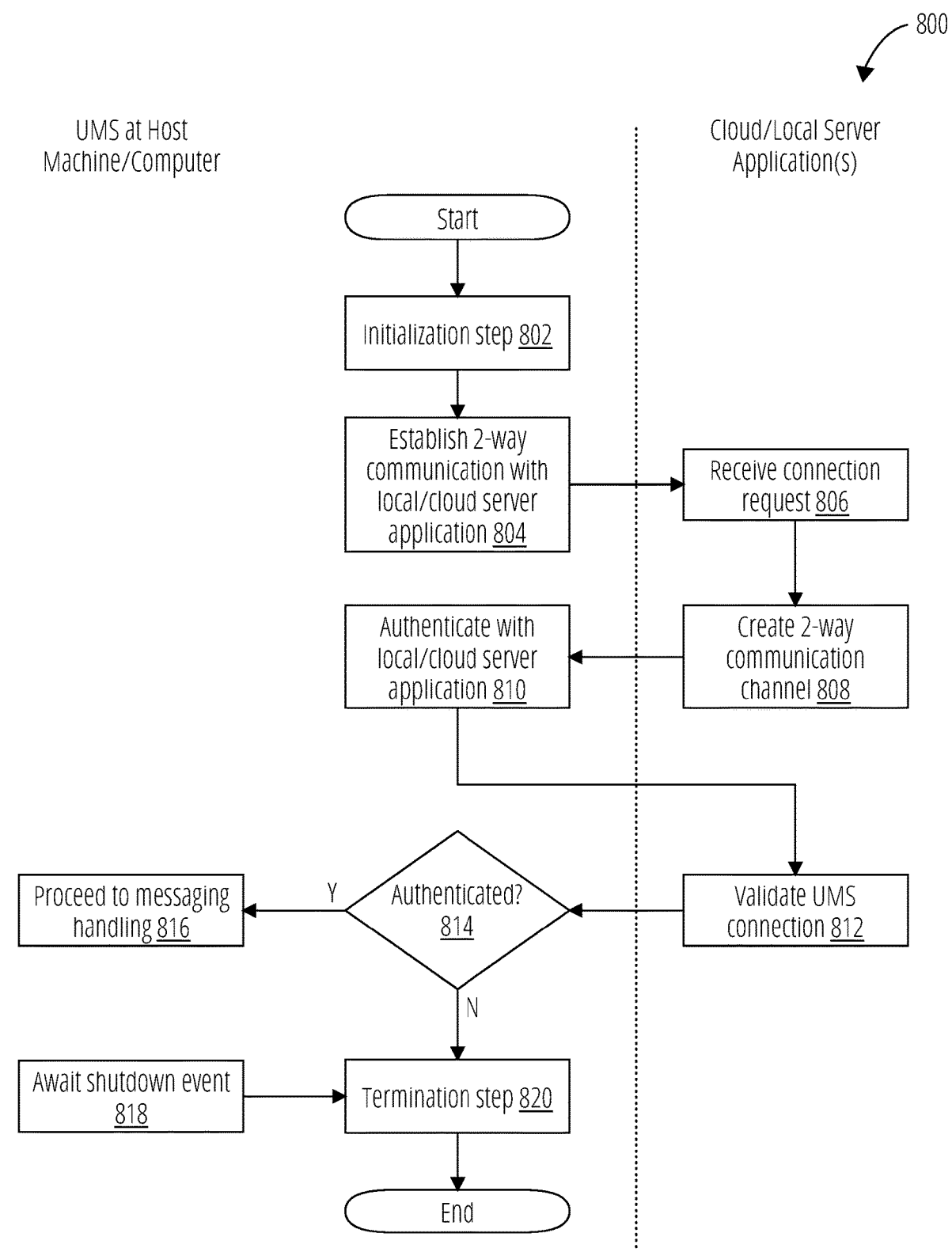
FIG. 8 illustrates a UMS connection process 800 in accordance with one embodiment.

FIG. 8 illustrates a UMS connection process 800 in accordance with one embodiment. A UMS may be installed in a host machine such as a desktop computer, server, standalone device, or similar device. An initialization step at block 802 may include host machine restart, reboot, waking from a sleep state, or a similar event. After such an event, in block 804, the UMS may establish two-way communication with local and/or cloud server applications.

The local server applications and/or cloud server applications may receive the connection request at block 806. In response, at block 808, the cloud/local server applications may create a two-way communication channel with the UMS. At block 810, the UMS may authenticate the connection with local/cloud server application. At block 812, the cloud/local server applications may validate the established and authenticated UMS connection.

At decision block 814, the UMS may confirm that the two-way communication channel with the cloud/local server applications has been authenticated. If the UMS does not determine that the channel is authenticated, it may terminate at block 820, as it may not be permitted to send messages to the server applications. In another embodiment, the UMS service may try several times to re-establish a connection with the cloud/local server applications and be re-authenticated. In yet another embodiment, the UMS and/or server application may notify information technology (IT) staff, a manager, or a privileged user to attend to the authentication failure. The configuration of either the UMS or the cloud/local server applications may be updated in order to correct the issue causing the failure.

Once two-way communication is established and properly authenticated, as determined at decision block 814 the message handling may proceed at block 816. Once authenticated and connected, the UMS may monitor incoming messages indefinitely until a shutdown event is detected at block 818. A shut down event may include the host machine shutting down, powering off, or entering a sleep state, the UMS itself being manually terminated, or a similar event that intentionally or unintentionally disrupts the two-way communication connection between the UMS and the cloud/local server applications. Such a termination step at block 820 may end the UMS connection process 800.

Figure 9A:
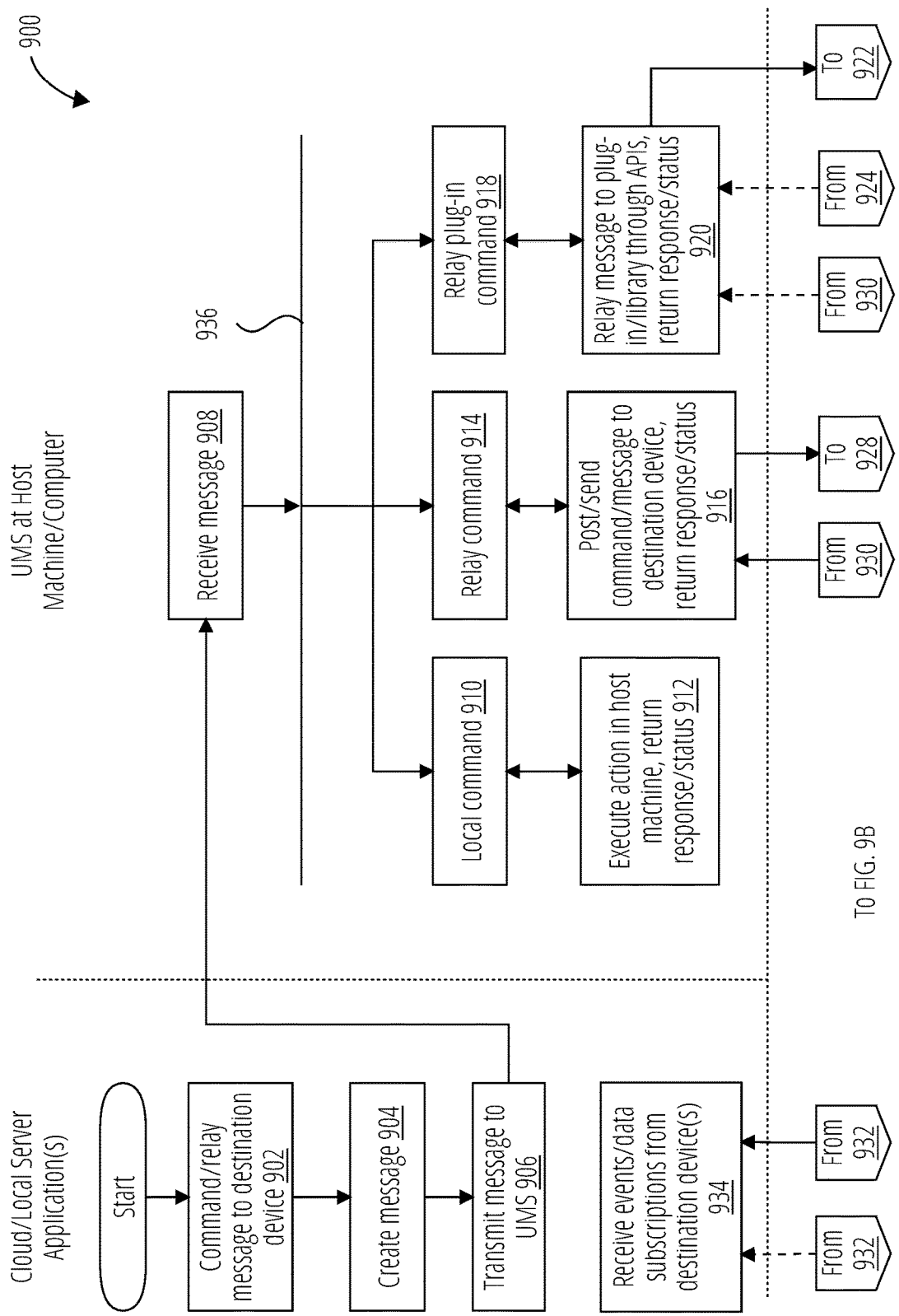
FIG. 9A and FIG. 9B illustrate a message handling process 900 in accordance with one embodiment.
Figure 9B:
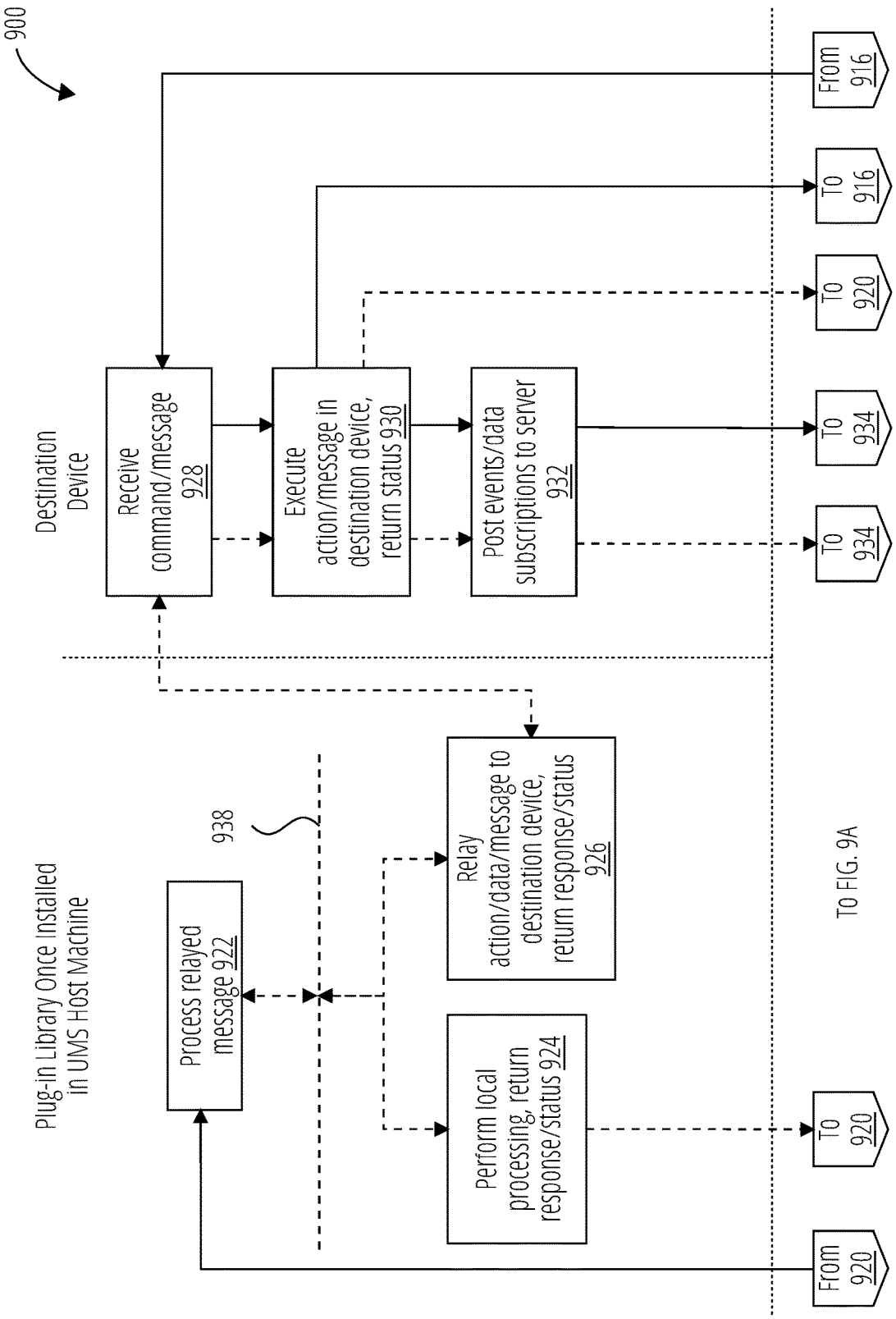

FIG. 9A and FIG. 9B together illustrate a message handling process 900 in accordance with one embodiment. The message handling process 900 may begin at block 902 in FIG. 9A, when a cloud or local server application sends a command or message intended for a destination device. The destination device may be activated or chosen through a user interface in one embodiment. The cloud or local server application may create the message for transmission at block 904. This message may be the local command, relay command, or relay plug-in command described with reference to FIG. 3-FIG. 5 above. In block 906, the cloud or local server application may transmit the command or message to the UMS. Transmission may be accomplished through the connected Universal Messaging Service connections that are associated with the intended destination device(s).

The UMS on the host machine or computer may await or monitor for incoming messages from connected cloud or local server applications. In block 908, the UMS may receive the message transmitted in block 906. The UMS on the host machine may parse and identify the type of incoming message through a host parse and identify 936 stage. The UMS may identify whether the message received in block 908 is a local command, indicating the UMS may proceed to block 910, a relay command, for which the UMS may proceed to block 914, or a relay plug-in command, indicating the UMS may proceed to block 918.

In block 910, the UMS may identify the received message as a local command. In this case, the UMS may execute the action in host machine and return a response or status at block 912. The UMS may be configured to recognize a set of pre-defined actions for local commands. These actions may include auto-discovery of destination devices, retrieval of device attributes through SNMP, HyPAS, or similar technologies, destination device firmware updates, destination device settings queries and changes, rebooting or restarting the destination device, waking the destination device up from a sleep state, and similar actions. In one embodiment, the UMS may return a status or response from such an operation to the cloud or local server application after the operation is complete.

In block 914, the UMS may detect a relay command. In this case, the UMS may proceed to block 916 and may post or send the command or message to the intended destination device. In one embodiment, the UMS may relay the embedded-sub-message data in the relay command. The embedded-sub-message data may be in a message format such as JDF, XML, JSON, or other message formats that the device(s) can process. The sub-message may also be a print job or other data that the device(s) may process. Such jobs may be in the message types JDF, PDF, PCL, PPML, XPS, or similar. The destination device may receive the command or message from the UMS at block 928, as indicated by the solid line from block 916 to block 928, shown in FIG. 9B.

In block 918, the UMS may detect a relay plug-in command and proceed to block 920. In block 920, the UMS may relay the command or embedded-sub-message data to the installed plug-in/library through APIs. The command or embedded-sub-message data may be received at the plug-in library in step block 922, shown in FIG. 9B.

At block 922 in FIG. 9B, the plug-in library processes a relay plug-in command sent from the UMS in block 920. In one embodiment, the plug-in library may receive embedded-sub-message data from the UMS component. At a plug-in library parse and identify 938 stage, the plug-in library may parse and identify the received sub-message for processing in the plug-in library. Actions taken based on a command or data relayed to and parsed by the plug-in library are indicated by dashed lines.

The embedded-sub-message data may be something the plug-in library knows how to perform or execute locally on the host machine. In this case, it may perform local processing at block 924. Once the plug-in library has completed the action indicated, it may return a response or status to the UMS at block 920 in FIG. 9A. The UMS may in turn relay the status or response to the originating server application after the operation is completed.

Alternately, the command or message processed at plug-in library parse and identify 938 may be a message that the plug-in library knows how to forward to destination devices, including other applications running on the host machine. At block 926, the plug-in library may, in this case, relay the action, data, or message to the destination device, as indicated by the dashed line from block 926 to block 928.

At block 928, the destination device may receive commands and messages from both the UMS (indicated by solid lines) and the plug-in library (indicated by dashed lines). Destination devices may be printers, MFPs, display devices/monitors, storage devices, fax machines, scanning machines, among others. Destination devices may alternately be in the form of software services or applications in the host machine, in another device in the network, or in other remote systems. Device(s) may come with firmware able to process the received messages. The firmware may support message formats such as JDF, XML, JSON, etc. The firmware may alternately support message types such as JDF, PDF, PCL, PPML, XPS, etc. In one embodiment, plug-in firmware may be installed on the device(s) to support newer message formats or message types that may not yet be supported in the shipped firmware on the device(s).

At block 930, the destination device may execute the action or message received at block 928. When execution is complete, the destination device may return a response or status. For commands or messages received directly from the UMS, as indicated by the solid line from block 916 in FIG. 9A to block 928 in FIG. 9B, the destination device may return the status or response to the UMS at block 916. The UMS may then return the status or response from to the initiating server application indicating the operation is completed. For messages or commands received from the plug-in library, the destination device may return messages to the UMS as indicated by the dashed line from block 930 to block 920 on FIG. 9A. The UMS may then return the status or response to the initiating server application indicating the operation is completed.

In one embodiment, execution at block 930 may result in events or data subscriptions to be posted to the originating server at block 932. In this case, from block 932 in FIG. 9B, the message handling process 900 may return to FIG. 9A, to block 934. At block 934, the cloud or local server applications may receive events or data subscriptions from the destination devices. These events or data descriptions may result from commands or messages sent from the UMS, as indicated by solid lines, or from the plug-in library, as indicated by dashed lines. Device(s) may return status or responses to the sender of the message via HTTP or other means of communication. Device(s) may also post or upload status, responses, events, or data directly to the server via Internet protocols, if the servers are accessible in that manner.

Figure 10:
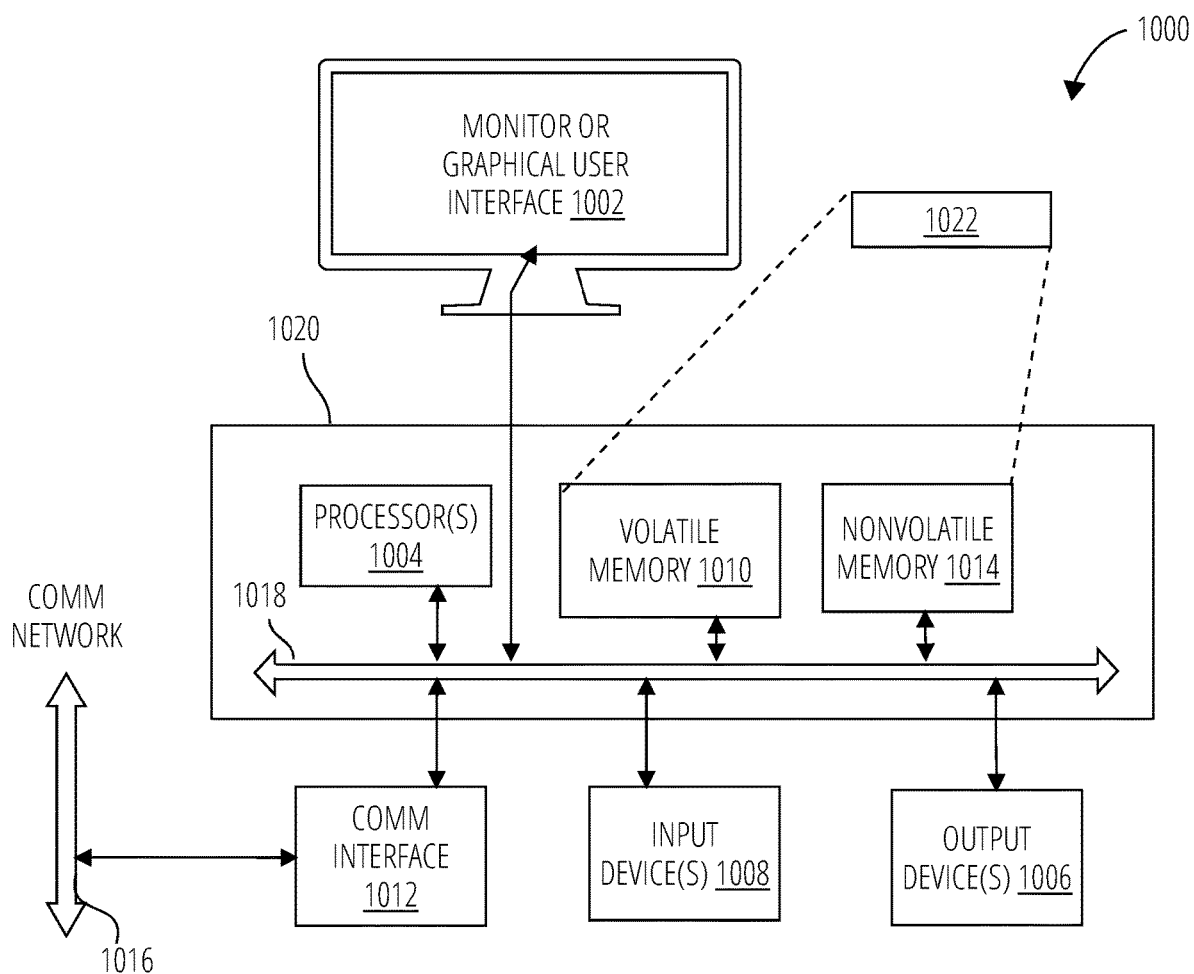
FIG. 10 is an example block diagram of a computing apparatus 1000 that may incorporate embodiments of the present disclosure.

FIG. 10 is an example block diagram of a computing apparatus 1000 that may incorporate embodiments of the present disclosure. FIG. 10 is merely illustrative of a machine system to carry out aspects of the technical processes described herein, and does not limit the scope of the claims. One of ordinary skill in the art would recognize other variations, modifications, and alternatives. In one embodiment, the computing apparatus 1000 typically includes a monitor or graphical user interface 1002, a data processing system 1020, a communication network interface 1012, input device(s) 1008, output device(s) 1006, and the like.

As depicted in FIG. 10, the data processing system 1020 may include one or more processor(s) 1004 that communicate with a number of peripheral devices via a bus subsystem 1018. These peripheral devices may include input device(s) 1008, output device(s) 1006, communication network interface 1012, and a storage subsystem, such as a volatile memory 1010 and a nonvolatile memory 1014.

The volatile memory 1010 and/or the nonvolatile memory 1014 may store computer-executable instructions and thus forming logic 1022 that when applied to and executed by the processor(s) 1004 implement embodiments of the processes disclosed herein.

The input device(s) 1008 include devices and mechanisms for inputting information to the data processing system 1020. These may include a keyboard, a keypad, a touch screen incorporated into the monitor or graphical user interface 1002, audio input devices such as voice recognition systems, microphones, and other types of input devices. In various embodiments, the input device(s) 1008 may be embodied as a computer mouse, a trackball, a track pad, a joystick, wireless remote, drawing tablet, voice command system, eye tracking system, and the like. The input device(s) 1008 typically allow a user to select objects, icons, control areas, text and the like that appear on the monitor or graphical user interface 1002 via a command such as a click of a button or the like.

The output device(s) 1006 include devices and mechanisms for outputting information from the data processing system 1020. These may include the monitor or graphical user interface 1002, speakers, printers, infrared LEDs, and so on as well understood in the art.

The communication network interface 1012 provides an interface to communication networks (e.g., communication network 1016) and devices external to the data processing system 1020. The communication network interface 1012 may serve as an interface for receiving data from and transmitting data to other systems. Embodiments of the communication network interface 1012 may include an Ethernet interface, a modem (telephone, satellite, cable, ISDN), (asynchronous) digital subscriber line (DSL), Fire-Wire, USB, a wireless communication interface such as BlueTooth or WiFi, a near field communication wireless interface, a cellular interface, and the like.

The communication network interface 1012 may be coupled to the communication network 1016 via an antenna, a cable, or the like. In some embodiments, the communication network interface 1012 may be physically integrated on a circuit board of the data processing system 1020, or in some cases may be implemented in software or firmware, such as "soft modems", or the like.

The computing apparatus 1000 may include logic that enables communications over a network using protocols such as HTTP, TCP/IP, RTP/RTSP, IPX, UDP and the like.

The volatile memory 1010 and the nonvolatile memory 1014 are examples of tangible media configured to store computer readable data and instructions to implement various embodiments of the processes described herein. Other types of tangible media include removable memory (e.g., pluggable USB memory devices, mobile devices SIM cards), optical storage media such as CD-ROMS, DVDs, semiconductor memories such as flash memories, non-transitory read-only-memories (ROMS), battery-backed volatile memories, networked storage devices, and the like. The volatile memory 1010 and the nonvolatile memory 1014 may be configured to store the basic programming and data constructs that provide the functionality of the disclosed processes and other embodiments thereof that fall within the scope of the present disclosure.

Logic 1022 that implements embodiments of the present disclosure may be stored in the volatile memory 1010 and/or the nonvolatile memory 1014. Said logic 1022 may be read from the volatile memory 1010 and/or nonvolatile memory 1014 and executed by the processor(s) 1004. The volatile memory 1010 and the nonvolatile memory 1014 may also provide a repository for storing data used by the logic 1022.

The volatile memory 1010 and the nonvolatile memory 1014 may include a number of memories including a main random access memory (RAM) for storage of instructions and data during program execution and a read only memory (ROM) in which read-only non-transitory instructions are stored. The volatile memory 1010 and the nonvolatile memory 1014 may include a file storage subsystem providing persistent (non-volatile) storage for program and data files. The volatile memory 1010 and the nonvolatile memory 1014 may include removable storage systems, such as removable flash memory.

The bus subsystem 1018 provides a mechanism for enabling the various components and subsystems of data processing system 1020 communicate with each other as intended. Although the communication network interface 1012 is depicted schematically as a single bus, some embodiments of the bus subsystem 1018 may utilize multiple distinct busses.

It will be readily apparent to one of ordinary skill in the art that the computing apparatus 1000 may be a device such as a smartphone, a desktop computer, a laptop computer, a rack-mounted computer system, a computer server, or a tablet computer device. As commonly known in the art, the computing apparatus 1000 may be implemented as a collection of multiple networked computing devices. Further, the computing apparatus 1000 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly specifies otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

What is claimed is:

1. A method comprising:
configuring a host machine with a universal message service (UMS), wherein the UMS transmits to and receives from at least one of a local server application and a cloud server application, and transmits to at least one destination device;
configuring the UMS with a plug-in service, wherein the plug-in service accommodates at least one plug-in library, and wherein the at least one plug-in library comprises at least one installable plug-in module;
receiving a formatted message at the UMS from at least one of the local server application and the cloud server application, wherein the formatted message includes a destination identification, a command message type, an actual message type, and an actual message including embedded-sub-message data;
parsing and identifying the command message type at the UMS, wherein the command message type is at least one of a local command, a relay command, and a relay plug-in command; and
performing at least one action based on the command message type, wherein the at least one action includes at least one of executing the local command on the host machine, relaying the embedded-sub-message data to the at least one destination device as indicated by the destination identification, and relaying the embedded-sub-message data to the plug-in service.

2. The method of claim 1, further comprising:
parsing and identifying, by the plug-in service, relayed embedded-sub-message data from the UMS;
translating the relayed embedded-sub-message data using the plug-in service, resulting in translated embedded-sub-message data; and
performing at least one of:
executing the translated embedded-sub-message data on the UMS;
relaying the translated embedded-sub-message data to another application running on the host machine;
relaying the translated embedded-sub-message data to the at least one destination device; and on condition that the at least one destination device does not have an ability to process the translated embedded-sub-message data, sending a response to a user.

3. The method of claim 1, wherein the command message type is the local command executed on at least one of the UMS and another application running on the host machine, and wherein the local command indicates actions including:
auto-discovery of the at least one destination device;
retrieval of device attributes for the at least one destination device;
destination device firmware updates for the at least one destination device;
destination device settings queries and changes to the at least one destination device;
rebooting the at least one destination device;
restarting the at least one destination device; and
waking the at least one destination device up from a sleep state.

4. The method of claim 1, wherein the command message type is the relay command, and the method further comprising:
transmitting the formatted message to the at least one destination device, wherein the relay command includes the embedded-sub-message data to be processed.

5. The method of claim 1, further comprising:
installing the at least one plug-in library to the plug-in service.

6. The method of claim 5, wherein the command message type is the relay plug-in command and the plug-in service includes the at least one plug-in library, and the method further comprising:
transmitting the formatted message to the plug-in service, wherein the relay plug-in command is at least one of a plain data message that the at least one plug-in library is able to understand and an executable script that the at least one plug-in library is able to execute.

7. The method of claim 5, wherein installing the at least one plug-in library comprises using a plug-in library installation program stored on the host machine.

8. The method of claim 5, further comprising:
packaging at least one of plug-in library files, plug-in library scripts, installable plug-in modules, and a plug-in library installation program into a local command message;
receiving, at the UMS, the local command message, wherein the local command message instructs the UMS to install at least one of the plug-in library files, the plug-in library scripts, the installable plug-in modules, and the plug-in library installation program; and
installing the at least one plug-in library on the host machine.

9. The method of claim 8, further comprising
calling, by the UMS, at least one of an operating system process and a third-party tool to perform the installation of the at least one plug-in library on the host machine.

10. The method of claim 8, further comprising at least one of:
auto-registering the at least one plug-in library with the UMS upon installation of the at least one plug-in library and instructing the UMS to call a registration application programming interface of the at least one plug-in library to register the at least one plug-in library with the UMS.

11. A computing apparatus comprising:
a processor; and
a memory storing instructions that, when executed by the processor, configure the computing apparatus to:
configure a host machine with a universal message service (UMS), wherein the UMS transmits to and receives from at least one of a local server application and a cloud server application, and transmits to at least one destination device;
configure the UMS with a plug-in service, wherein the plug-in service accommodates at least one plug-in library, and wherein the at least one plug-in library comprises at least one installable plug-in module;
receive a formatted message at the UMS from at least one of the local server application and the cloud server application, wherein the formatted message includes a destination identification, a command message type, an actual message type, and an actual message including embedded-sub-message data;
parse and identify the command message type at the UMS, wherein the command message type is at least one of a local command, a relay command, and a relay plug-in command; and
perform at least one action based on the command message type, wherein the at least one action includes at least one of executing the local command on the host machine, relaying the embedded-sub-message data to the at least one destination device as indicated by the destination identification, and relaying the embedded-sub-message data to the plug-in service.

12. The computing apparatus of claim 11, wherein the instructions further configure the computing apparatus to:
parse and identify, by the plug-in service, relayed embedded-sub-message data from the UMS;
translate the relayed embedded-sub-message data using the plug-in service, resulting in translated embedded-sub-message data; and
perform at least one of:
execute the translated embedded-sub-message data on the UMS;
relay the translated embedded-sub-message data to another application running on the host machine;
relay the translated embedded-sub-message data to the at least one destination device; and
on condition that the at least one destination device does not have an ability to process the translated embedded-sub-message data, send a response to a user.

13. The computing apparatus of claim 11, wherein the command message type is the local command executed on at least one of the UMS and another application running on the host machine, and wherein the local command indicates actions including:
auto-discovery of the at least one destination device;
retrieval of device attributes for the at least one destination device;
destination device firmware updates for the at least one destination device;
destination device settings queries and changes to the at least one destination device;
rebooting the at least one destination device;
restarting the at least one destination device; and
waking the at least one destination device up from a sleep state.

14. The computing apparatus of claim 11, wherein the command message type is the relay command, and wherein the instructions further configure the computing apparatus to:

transmit the formatted message to the at least one destination device, wherein the relay command includes the embedded-sub-message data to be processed.

15. The computing apparatus of claim 11, wherein the instructions further configure the computing apparatus to:

install the at least one plug-in library to the plug-in service.

16. The computing apparatus of claim 15, wherein the command message type is the relay plug-in command and the plug-in service includes the at least one plug-in library, and wherein the instructions further configure the computing apparatus to:

transmit the formatted message to the plug-in service, wherein the relay plug-in command is at least one of a plain data message that the at least one plug-in library is able to understand and an executable script that the at least one plug-in library is able to execute.

17. The computing apparatus of claim 15, wherein installing the at least one plug-in library comprises using a plug-in library installation program stored on the host machine.

18. The computing apparatus of claim 15, wherein the instructions further configure the computing apparatus to:

package at least one of plug-in library files, plug-in library scripts, installable plug-in modules, and a plug-in library installation program into a local command message;

receive, at the UMS, the local command message, wherein the local command message instructs the UMS to install at least one of the plug-in library files, the plug-in library scripts, the installable plug-in modules, and the plug-in library installation program; and install the at least one plug-in library on the host machine.

19. The computing apparatus of claim 18, wherein the instructions further configure the computing apparatus to:

call, by the UMS, at least one of an operating system process and a third-party tool to perform the installation of the at least one plug-in library on the host machine.

20. The computing apparatus of claim 18, wherein the instructions further configure the computing apparatus to:

auto-register the at least one plug-in library with the UMS upon installation of the at least one plug-in library and instruct the UMS to call a registration application programming interface of the at least one plug-in library to register the at least one plug-in library with the UMS.

* * * * *